United States Patent [19]

Yamada et al.

[11] 4,456,980
[45] Jun. 26, 1984

[54] SEMICONDUCTOR MEMORY DEVICE

[75] Inventors: Junzo Yamada, Iruma; Tsuneo Mano, Kodaira; Junichi Inoue, Chofu, all of Japan

[73] Assignee: Nippon Telegraph & Telephone Public Corporation, Tokyo, Japan

[21] Appl. No.: 357,840

[22] Filed: Mar. 15, 1982

[30] Foreign Application Priority Data

Mar. 17, 1981 [JP] Japan .................................. 56-37223

[51] Int. Cl.³ ....................... G11C 29/00; G06F 11/10
[52] U.S. Cl. ........................................ 365/200; 371/50
[58] Field of Search .......................... 365/200; 371/50

[56] References Cited

U.S. PATENT DOCUMENTS

| | | | |
|---|---|---|---|
| 3,067,407 | 12/1962 | Schaaf .................................... | 371/50 |
| 3,242,461 | 3/1966 | Silberg et al. .......................... | 371/50 |
| 4,183,463 | 1/1980 | Kemmetmueller ................. | 364/900 |
| 4,228,528 | 10/1980 | Cenker et al. ....................... | 365/200 |
| 4,365,332 | 12/1982 | Rice ...................................... | 371/50 |

Primary Examiner—James W. Moffitt
Attorney, Agent, or Firm—Charles E. Pfund

[57] ABSTRACT

A semiconductor memory device comprises at least one word line, a plurality of bit lines extending across the word line, a data memory cell unit including a plurality of data memory cells connected between the word line and the bit lines for storing information, a plurality of first extra bit lines corresponding to first groups of the bit lines, each of which has k bit lines (k is an integer), and extending across the word line, a plurality of first extra memory cells connected between the word line and the first extra bit lines for storing first checking information with respect to the first groups of the bit lines, a plurality of second extra bit lines corresponding to second groups of the bit lines, each of which group has m bit lines (m is an integer), and extending across the word line, a plurality of second extra memory cells connected between the word line and the second extra bit lines for storing second checking information with respect to the second groups of the bit lines, an error detection circuit for comparing the information fed from the data memory cells with the contents of the first and second extra memory cells to detect errors, and a circuit responsive to an output from the error detection circuit for correcting the information fed from the data memory cells, the first extra bit lines being grouped correspondingly to the first groups of the bit lines, the second extra bit lines being grouped correspondingly to the second groups of the bit lines, each of the second groups of the second extra bit lines being composed of the first extra bit lines in each first group thereof.

7 Claims, 7 Drawing Figures

SEMICONDUCTOR MEMORY DEVICE

BACKGROUND OF THE INVENTION

The present invention relates to a semiconductor memory device, and more particularly to a semiconductor memory device for storing data containing a function of correcting the error of at least one bit.

Some prior semiconductor memory devices include auxiliary saving bit lines which serve to replace fixed defective bit lines produced at manufacturing stages for thereby improving the yield of memory devices. The replacement of defective bits with rescue bits in such semiconductor memory devices is carried out by a circuit designed exclusively for the replacing operation, a laser device, or other suitable devices. With the conventional arrangement, while the fixed defective bits included during the fabrication steps can be remedied, no unfixed bit defects which could be created by the encounter with alpha rays or the like can be saved at all.

There have been developed various systems for correcting bit errors on LSI chips which contain semiconductor memory devices, utilizing the following techniques:

(1) Error correction on majority logic;
(2) On-chip encoding/decoding circuit using an error correcting code; and
(3) On-chip horizontal and vertical parity check system.

The technique (1) however requires a chip having an area which is about three times as large as the area of a chip with no error correction arrangement thereon. The expedient (2) necessitates an additional error correction circuit which is of a relatively large scale and will consume an increased amount of electric power. The system (3) needs a large number of check bits because of parity checking required on all of data bits for correcting the error of one bit, and hence takes an extended period of time for error correction and results in increased electric power consumption.

SUMMARY OF THE INVENTION

It is a primary object of the present invention to provide a semiconductor memory device containing therein fewer bit errors than conventional semiconductor memory devices for improved effective yield at the time of fabrication or higher reliability in operation.

Another object of the present invention is to provide a semiconductor memory device which is compact in size.

Still another object of the present invention is to provide a semiconductor memory device which will not consume an increased amount of electric power despite its ability to reduce bit errors.

A still further object of the present invention is to provide a semiconductor memory device which includes an additional small-scale circuit that is self-corrective of bit errors within a short period of time.

To achieve the foregoing objects, a semiconductor memory device according to the present invention incorporates therein a one-dimensional horizontal and vertical parity checking system.

As is well known, a horizontal and vertical parity checking system uses additional horizontal and vertical parity bits of logic "1" or "0" in rows and columns of a plurality of information data bits on an MxN matrix such that the total number of 1s (or 0s) in each row and column plus the parity bit is always an even or odd number. If an error occurs in any data bit, the position of such erroneous data bit can be located by checking all of horizontal and vertical parity bit information. The known horizontal and vertical parity checking system is two-dimensional.

According to the present invention, there is provided a semiconductor memory device comprising at least one word line, a plurality of bit lines extending across the word line, a data memory cell unit including a plurality of data memory cells connected between the word line and the bit lines for storing information, a plurality of first extra bit lines corresponding to first groups of the bit lines, each of which group has k bit lines (k is an integer), and extending across the word line, a plurality of first extra memory cells connected between the word line and the first extra bit lines for storing first checking information with respect to the first groups of the bit lines, a plurality of second extra bit lines corresponding to second groups of the bit lines, each of which group has m bit lines (m is an integer), and extending across the word line, a plurality of second extra memory cells connected between the word line and the second extra bit lines for storing second checking information with respect to the second groups of the bit lines, an error detection circuit for comparing the information fed from the data memory cells with the contents of the first and second extra memory cells to detect errors, and a circuit responsive to an output from the error detection circuit for correcting the information fed from the data memory cells, the first extra bit lines being grouped correspondingly to the first groups of the bit lines, the second extra bit lines being grouped correspondingly to the second groups of the bit lines, each of the second groups of the second extra bit lines being composed of one of the first extra bit lines in each first group thereof.

The above and other objects, features and advantages of the present invention will become more apparent from the following description when taken in conjunction with the accompanying drawings in which certain preferred embodiments of the invention are shown by way of illustrative example.

DETAILED DESCRIPTION OF THE PREFERRED EMBODIMENTS

Figures 1A, 1B:
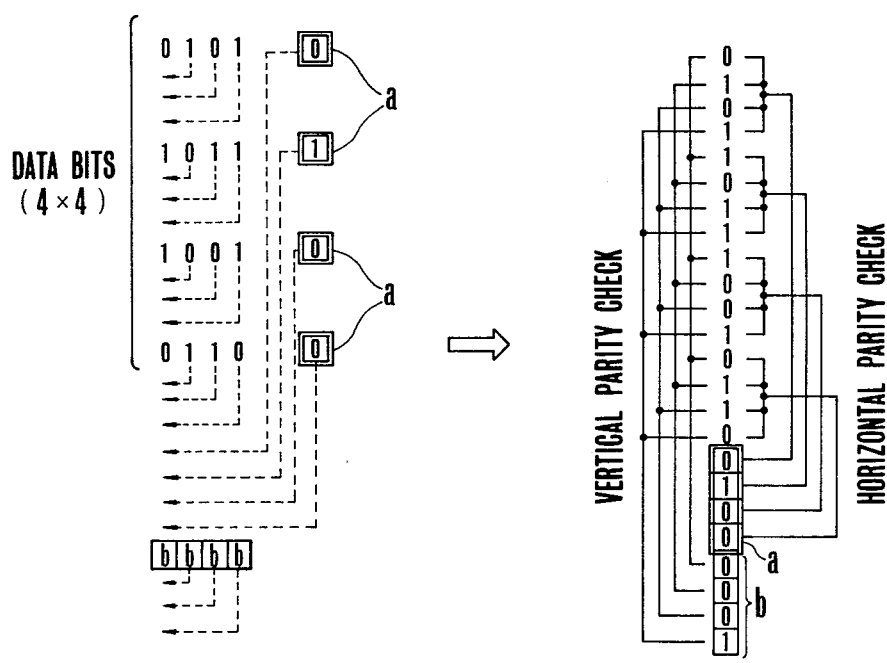
FIGS. 1A and 1B are diagrammatic views showing the principles of horizontal and vertical parity checking systems applicable to a semiconductor memory device according to the present invention.

FIG. 1A shows horizontal parity bits a and vertical parity bits b which are appended horizontally and vertically respectively to a 4×4 matrix of 16 data bits. The parity checking system shown in FIG. 1A is an even-parity-bit checking system in which the sum of 1-bits in each horizontal row and vertical column is always even. For the sake of brevity, the even-parity-bit checking system will be relied on throughout the specification.

By transferring the data bits and the parity check bits a, b along the dotted-line arrows in FIG. 1A, the two-dimensional matrix can be transformed into a one-dimensional matrix as illustrated in FIG. 1B. Any errors in upper 16 data bits out of the total of 24 bits in the one-dimensional matrix can detected in position by comparing groups of bits connected by solid lines with lower 8 parity bits. Thus, a fixed or unfixed bit defect in any one of the upper 16 bits can be detected and corrected with ease. The foregoing arrangement is indicative of the principle of the present invention based on which a single erroneous bit can be corrected.

Figures 2, 2A:
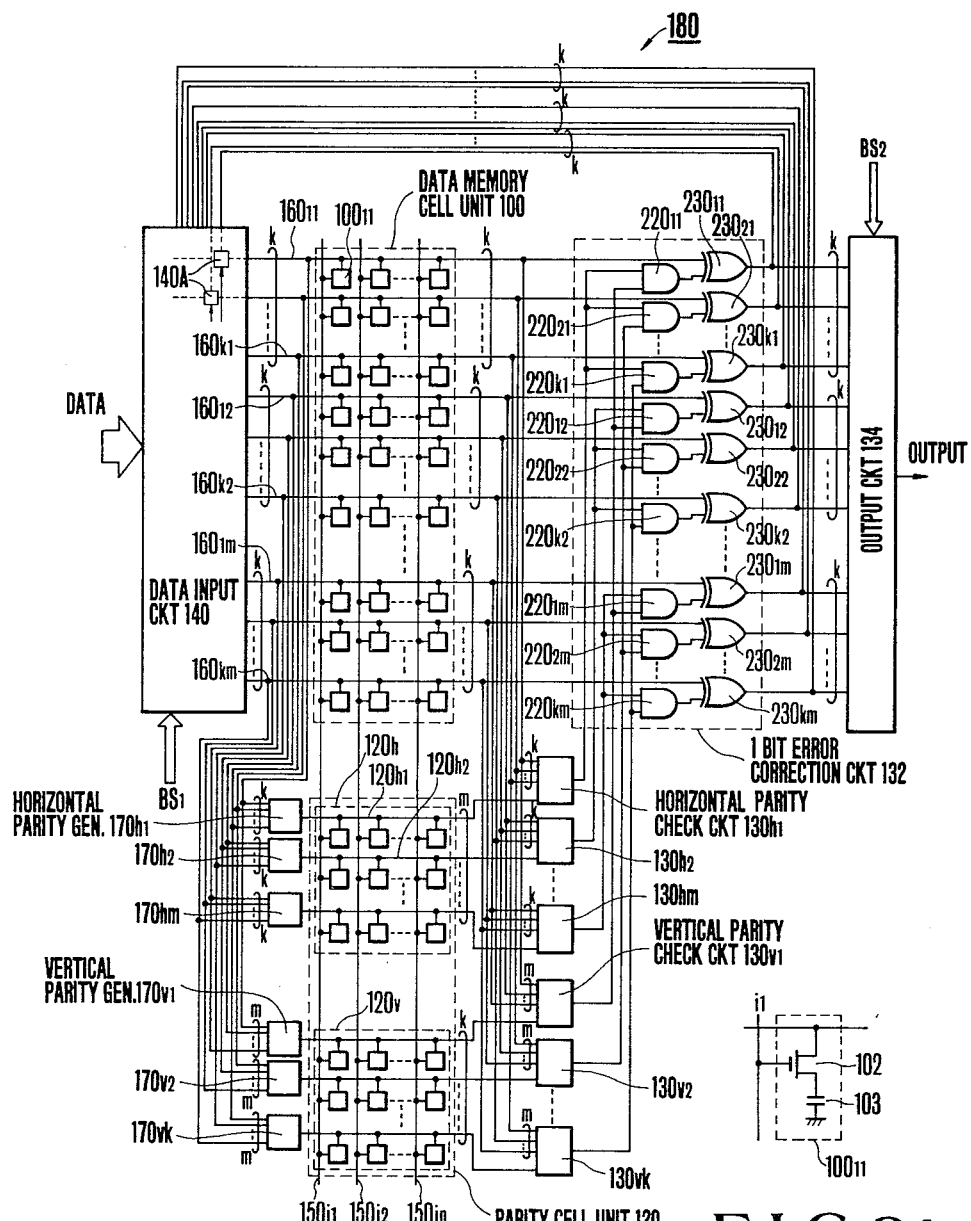
FIG. 2 is a block diagram illustrative of the fundamental arrangement of a semiconductor memory device constructed on the principles shown in FIGS. 1A and 1B.
FIG. 2A is an enlarged circuit diagram of a data memory cell in the semiconductor memory device shown in FIG. 2.
Figure 3:
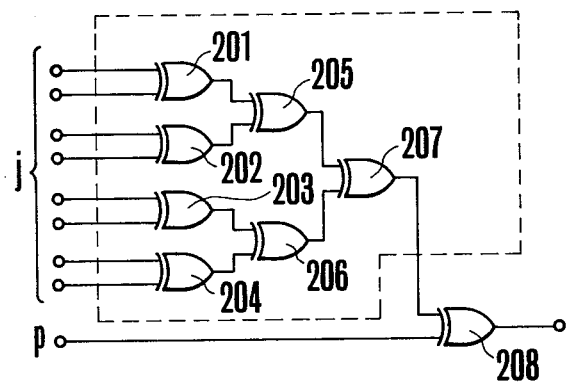
FIG. 3 is a circuit diagram of a parity checking circuit in the semiconductor memory device illustrated in FIG. 2.

FIG. 2 illustrates a semiconductor memory device according to an embodiment of the present invention. The semiconductor memory device includes a data memory cell unit 100 for storing data bit information which comprises a matrix of data memory cells 100$_{11}$ each including, as shown in FIG. 2A, a field-effect transistor 102 and a capacitor 103 connected in series between a bit line and the ground, the transistor 102 having a gate connected to a word line. The construction and operation of the data memory cells are well known in the art and hence will not be described in detail. The semiconductor memory device also has a parity cell unit 120 for storing horizontal and vertical parity check bit information. The parity cell unit 120 is composed of a first excess memory cell matrix 120$_h$ for storing horizontal parity check bit information, and a second excess memory cell matrix 120$_v$ for storing vertical parity check bit information. Each of the matrices 120$_h$, 120$_v$ have a plurality of memory cells each of which is of the same construction as that of the data memory cell described above. A parity checking and correcting unit 130 comprises horizontal parity checking circuits 130$_{h1}$–130$_{hm}$, vertical parity checking circuits 130$_{v1}$–180$_{vk}$, a one-bit error correction circuit 132, and a data output circuit 134. Each of the parity checking circuits 130$_{h1}$–130$_{hm}$, 130$_{v1}$–130$_{vm}$ in the parity checking and correcting unit 130 is, for example, constructed as shown in FIG. 3. In this example, k (orm) is defined as 8 and each parity checking circuit is composed of eight EXCLUSIVE-OR gates 201–208. Each of the gates 201–204 is supplied with two bits out of eight data bits indicated at j. The gate 205 is supplied with outputs from the gates 201, 202, and the gate 206 is supplied with outputs from the gates 203, 204. The gates 205, 206 produce outputs that are fed to the gate 207. The gate 208 is supplied with an output from the gate 207 and a signal indicative of a parity check bit p. The gate 208 produces an output, which is delivered as an output from each parity checking circuit. The 8-bit data bit information j is supplied from the output of the data memory cell unit 100, that is, data bit lines corresponding to selected memory cells. Thus, the parity checking circuit 130$_{h1}$ receives data bit information from data bit lines 160$_{11}$, 160$_{21}$, . . . 160$_{k1}$, and a parity check bit p from a bit line 120$_{h1}$ in the first excess memory matrix 120$_h$. The other parity checking circuits 130$_{h2}$–130$_{hm}$ are supplied with data bits and parity check bits over corresponding bit lines. The parity checking circuits 130$_{v1}$–130$_{vk}$ are supplied with data bits from the same data bit lines, and with parity check bits p respectively from bit lines in the second excess memory cell matrix 120$_v$.

As shown in FIG. 2, the one-bit error correction circuit 132 comprises AND gate 220$_{11}$–220$_{k1}$, 220$_{12}$–220$_{k2}$, 220$_{1k}$–220$_{km}$, and EXCLUSIVE-OR gates 230$_{11}$–230$_{k1}$, 230$_{12}$–230$_{k2}$, 230$_{1m}$–230$_{km}$. The AND gate 220$_{11}$ performs logical multiplication on, or ANDing of, an output from the horizontal parity checking circuit 130$_{h1}$ and an output from the vertical parity checking circuit 130$_{v1}$. If the result of such logical multiplication is "0", it means that the contents of the data memory cells agree with those of the related horizontal and vertical parity check bits. Conversely, if the logical multiplication results is "1", it means that the contents of the data memory cells don't agree with those of the related horizontal and vertical parity check bits. The AND gate 220$_{11}$ delivers its output to the EXCLUSIVE-OR gate 230$_{11}$. When the output of the AND gate 220$_{11}$ is "0", the EXCLUSIVE-OR gate 230$_{11}$ allows an output from the data memory cell unit 100 over the data bit line 160$_{11}$ to pass therethrough as its own output. When the output of the AND gate 220$_{11}$ is "1", the EXCLUSIVE-OR gate 230$_{11}$ reverses an output from the data memory cell unit 100 over the data bit line 160$_{11}$, that is, corrects a one-bit error, and delivers such a reversed output to a subsequent stage. The other AND gates 220$_{21}$–220$_{km}$ and associated EXCLUSIVE-OR gates 230$_{21}$–230$_{km}$ operate in the same manner.

The data output circuit 134 serves to issue successively outputs or corrected data from the one-bit error correction circuit 132 based on bit selection signals.

The semiconductor memory device also includes a data input circuit 140 for delivering data supplied from an outside processing circuit (not shown) only to selected memory cells in the data memory cell unit 100 based on bit selection signals BS$_1$. The other unselected memory cells in the data memory cell unit 100 supplied by the data input circuit 140 with outputs from the one-bit error correction circuit 132. The data input circuit 140 has switch or gate circuits 140$_A$ responsive to the bit selection signals BS$_1$ for selectively delivering the data from the outside processing circuit and the bit information from the correction circuit 132 to the bit lines connected to the data memory cell unit 100. When the bit lines for memory cells in which new data are to be written are designated by the bit selection signals, the data input circuit 140 delivers exterior data to such selected bit lines and data from the correction circuit 132 to the other bit lines that are not selected. The semiconductor memory device includes word lines 150$_i$–150$_{in}$. The data bit lines 160$_{11}$–160$_{k1}$, 160$_{12}$–160$_{k2}$, . . . 160$_{1m}$–160$_{km}$ jointly constitute 1×m lines. The horizontal parity check bits are generated by over the data bit lines in groups of k bits, and hence the data bit lines are divided into m groups each for delivering k bits. The total number of the horizontal and vertical parity bit lines is k+m. The horizontal parity bit lines are divided into groups corresponding respectively to the data bit lines grouped as 160$_{11}$–160$_{k1}$, 160$_{12}$–160$_{k2}$, . . . 160$_{1m}$–160$_{km}$, and the vertical parity bit lines are grouped into divisions corresponding respectively to the data bit lines grouped as $160_{11}$, $160_{12}$ ... $160_{1m}$, $160_{21}$, $160_{22}$ ... $160_{2m}$, ... $160_{k1}$, $160_{k2}$, ... $160_{km}$.

Horizontal parity check bit generators $170_{h1}$–$170_{hm}$ are provided respectively for the foregoing groups of horizontal parity check bit lines, and vertical parity check bit generators $170_{v1}$–$170_{vk}$ are provided respectively for the above groups of vertical parity check bit lines.

The (k×m) data bit lines which are connected to the outputs of the data input circuit 140 and are divided into m groups each for k bits for forming horizontal parity bit information in k bits, are coupled to the horizontal parity check bit generators $170_{h1}$–$170_{hm}$ which are m in number. The (k×m) data bit lines which are divided into k groups each for m bits for forming vertical parity bit information in m bits, are coupled to the vertical parity check bit generators $170_{v1}$–$170_{vk}$ which are k in number.

Figure 4:
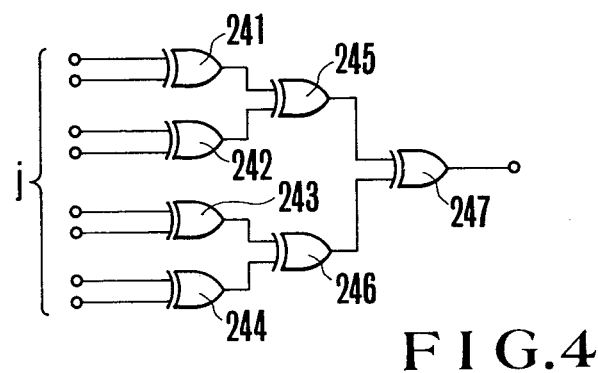
FIG. 4 is a circuit diagram of a parity bit generator in the semiconductor memory device.

As shown in FIG. 4, in the case of k (or m)=8, each of the parity check bit generators $170_{h1}$–$170_{hm}$, $170_{v1}$–$170_{vk}$ comprises seven EXCLUSIVE-OR gates 241–247 which are connected in the same arrangement as that of the EXCLUSIVE-OR gates 201–207 as enclosed by the dotted line in each parity checking circuit illustrated in FIG. 3. The EXCLUSIVE-OR gates 241–244 are supplied with the inputs j which are fed also to the EXCLUSIVE-OR gates 201–204. The first excess memory cell matrix $120_h$ in the parity cell unit 120 for storing the horizontal parity check bit information includes m excess bit lines corresponding respectively to the m groups of data bit lines for creating the horizontal parity check bit information. The second excess memory cell matrix $120_v$ for storing the vertical parity bit check information includes k excess bit lines corresponding respectively to the k groups of data bit lines for forming the vertical parity check bit information. These excess bit lines are coupled to the word lines $150_{i1}$–$150_{in}$ by excess memory cells in the first and second memory cell matrices $120_h$, $120_v$ of the parity cell unit 120.

When any one of the word lines $150_{i1}$–$150_{in}$ is energized, data bit information of (k×m) bits is read out of the data memory cells which are connected to the activated word line and led as m groups of data bit information each in k bits, corresponding to the grups of (k×m) data bit lines, to the m horizontal parity checking circuits $130_{h1}$–$130_{hm}$, respectively. The (k×m)-bit data information as divided in k groups each in m bits is delivered as grouped to the vertical parity checking circuits $130_{v1}$–$130_{vk}$. The m-bit horizontal parity check bit information and the k-bit vertical parity check bit information, which are read simultaneously with the reading of the (k×m)-bit data information, are supplied as checking information to the parity checking circuits $130_{h1}$–$130_{hm}$, $130_{v1}$–$130_{vk}$ for the corresponding groups. Output signals from the horizontal parity checking circits $130_{h1}$–$130_{hm}$ and those from the vertical parity checking circuits $130_{v1}$–$130_{vk}$ are delivered as inputs respectively to the AND gates $220_{11}$–$220_{km}$ of the correction circuit 132 to detect whether there is no error horizontally and vertically in the data bit information read from the data memory cell unit 100. The AND gates $220_{11}$–$220_{km}$ are (k×m) in number and divided into groups each containing k gates. Each of the AND gates, grouped as $220_{11}$–$220_{k1}$, $220_{12}$–$220_{k2}$, . . . $220_{1m}$–$220_{km}$ is supplied at one of its inputs with an output signal from one of the horizontal parity checking circuits $130_{h1}$–$130_{hm}$, and is also supplied at the other input with an output from one of the vertical parity checking circuits $130_{v1}$–$130_{vk}$. This arrangement determines whether there is no error in each delivered piece of data bit information horizontally and vertically. With the even-parity-bit checking system employed, the horizontal parity checking circuits $130_{h1}$–$130_{hm}$ will produce an output signal of "1" where an error is detected upon horizontal checking, and the vertical parity checking circuits $130_{v1}$–$130_{vk}$ will generate an output signal of "1" where an error is detected upon vertical checking.

The (k×m) AND gates $220_{11}$–$220_{km}$ deliver their output signals to the (k×m) EXCLUSIVE-OR gates $230_{11}$–$230_{km}$, respectively. The EXCLUSIVE-OR gates $230_{11}$–$230_{km}$ will reverse the logical values of the data bit information fed from the data memory cell unit 100 only when such supplied data bit information contains an error in both the horizontal and vertical directions. The output signals from the EXCLUSIVE-OR gates $230_{11}$–$230_{km}$ go to the output circuit 134 and simultaneously to the input circuit 140 as error-corrected data bit information by way of feedback paths 180.

Data information operation of the circuit arrangement shown in FIG. 2 will be described. When a desired one of the word lines $150_{i1}$–$150_{in}$ is activated, (k×m)-bit data bit information is read in parallel from a corresponding one of the groups of data memory cells in the data memory cell unit 100, which are connected to the selected word line, and at the same time, parallel m-bit horizontal parity check bit information and parallel k-bit vertical parity check bit information are read from the excess memory cells in the excess memory cell matrices $120_h$, $120_v$, which are connected to the selected word line. The (k×m)-bit data bit information thus read from the memory cell unit 100 is supplied one bit at a time to the EXCLUSIVE-OR gates $230_{11}$–$230_{km}$ in the error correction circuit 132, and is also supplied as grouped to the horizontal and vertical parity checking circuits $130_{h1}$–$130_{hm}$, $130_{v1}$–$130_{vk}$. The horizontal parity checking circuits $130_{h1}$–$130_{hm}$ compare the supplied data bit information with the horizontal parity check bit information read from the memory cell matrix $120_h$ to determine whether there is an error horizontally, and produce signals of "1" indicative of such an error when the error is included. Likewise, the vertical parity checking circuits $130_{v1}$–$130_{vk}$ compares the supplied data bit information with the vertical parity check bit information read from the memory cell matrix $120_v$ to determine whether an error is included verticaly, and generate signals of "1" indicative of such an error when the error takes place. The output signals from the horizontal parity checking circuits $130_{h1}$–$130_{hm}$ and the vertical parity checking circuits $130_{v1}$–$130_{vk}$ are delivered to the error correction circuit 132.

An instance in which the data bit information supplied to the EXCLUSIVE-OR gate $230_{11}$ contains an error will be described. The output signals from the horizontal parity checking circuit $130_{h1}$ and the vertical parity checking circuit $130_{v1}$ are "1". The logical value of only the data bit information fed to the EXCLUSIVE-OR gate $230_{11}$ is reversed, whereas the other data bit information is supplied as it is to the output circuit 134. The correction circuit 132 produces as outputs error-corrected data bit information. The error-corrected data bit information is delivered as an output by the output circuit 134 with desired one or more bits selected by the bit selection signal $BS_2$. At the same time, the output signals from the error correction circuit 132 are fed back via feedback lines 180 to the input circuit 140, from which the signals are stored again in the original memory cell positions in the data memory cell unit 100. Upon storing again such signals, horizontal and vertical parity check bit information based on the error-corrected data bit information is written in corresponding extra memory cells in the first and second extra memory cell matrices $120_h$, $120_v$.

New data bit information supplied from the exterior source will be written in as follows: The bit selection signal $BS_1$ is supplied to the input circuit 140 to indicate in which data memory cell on a desired word line new data should be written. The word line to which is connected the data memory cell in which the new data is to be written is energized at first, for thereby reading all of the data bit information from the data memory cells coupled to that word line in a manner similar to that for the foregoing data reading operation. Then, data bit information fed back from the error correction circuit 132 is caused to be stored again in the other data memory cells than the data memory cell in which the new data should be stored. Simultaneously, the data bit information from the exterior source is stored in the desired data memory cell. At this time, horizontal and vertical parity check bit information based on the new data bit information from the exterior source and the data bit information fed back from the error correction circuit 132 is formed in the parity check bit generators $170_{h1}$–$170_{hm}$, $170_{v1}$–$170_{vk}$, and stored in the extra memory cell matrices $120_h$, $120_v$.

The semiconductor memory device thus constructed has the following advantages:

(1) Horizontal and vertical parity checking can be performed at one time within the memory by activating a word line, that is, one-dimensional parity checking can be carried out. Bit errors produced in the memory device are thus fewer than those experienced with conventional memory devices, with the result that the effective yield of semiconductor memory devices can be increased or the semiconductor memory devices will operate with improved reliability. For example, assuming that the yield is expressed by the probability that the number of defective bits per word line with respect to the rate of occurence complete non-defective memory devices is 1 or less, the yields of conventional memory devices with no error correction circuits are 1%, 5%, and 10%, whereas corresponding yields of memory devices of the present invention are 25%, 41%, and 50% respectively. Therefore, the yields of semiconductor memory devices according to the present invention are much higher than the prior yields, and are substantially equal to those of peripheral circuits for memory devices, which can be manufactured on the current semiconductor fabrication technology. The rate of increase of reliability of the semiconductor memory device will be described with reference to soft errors caused by alpha rays. The rate of occurence of a soft error in an LSI memory device with 1 Mb having no error correction circuit can be determined by the probability that one alpha-ray particle hits a single memory cell. With the present invention, the same rate can be determined by the probability that one alpha-ray particle impinges upon two or more memory cells within an error correction period. For a 1 Mb RAM as an example, a rate of occurence of a soft error in a conventional semiconductor memory device is $10^3$ FIT (FIT=$10^{-9}$/hour) whereas a corresponding error occurence rate in a semiconductor memory device of the present invention is $10^{-5}$ FIT, and another prior error occurence rate is $10^6$ FIT while a corresponding error occurence rate according to the present invention is $10^{-2}$ FIT. The rate of occurence of soft errors in the semiconductor memory device of the invention is therefore quite reduced.

(2) With the arrangement of the present invention, most of an additional circuit required for correcting bit errors is in the parity cell unit, and the number of gates required in the parity checking and correcting unit is on the order of 4000 for a 1 Mb RAM. The ratio of the parity cell unit to the memory cell unit is $2\sqrt{N}$ where $N^2$ is the memory capacity, and hence becomes smaller as the memory capacity grows larger. The time interval ta required for error correction is given by:

$$ta = (3 + \log_2 \sqrt{N}) \times \Delta t$$

where N is the square root of the memory capacity ($N^2$=memory capacity), and $\Delta t$ is the delay time per gate. The error correction time for a 1 Mb RAM with $\Delta t = 2$ ns is 16 ns. with the added error correction circuit being small in scale according to the present invention, an increase in electric power consumption due to the added circuit is expected to amount to 10 mW or less for a 1 Mb RAM. Such a small increase in the consumed electric power does not substantially impair the memory performance. The semiconductor memory device according to the present invention is therefore advantageous in that the memory device itself can be compact in size, is capable of correcting bit errors within a short period of time, and does not involve a large increase in electric power consumption.

The semiconductor memory device according to the foregoing embodiment fails to correct two or more bit errors in one group out of the horizontal m bit line groups, or two or more bit errors in one group out of the vertical k bit line groups. However, the semiconductor memory device can have a function of correcting two or more bit errors by causing code information capable of detecting two or more bit errors, instead of parity check bit information, to be stored in the extra memory cell matrices $120_h$, $120_v$.

Figure 5:
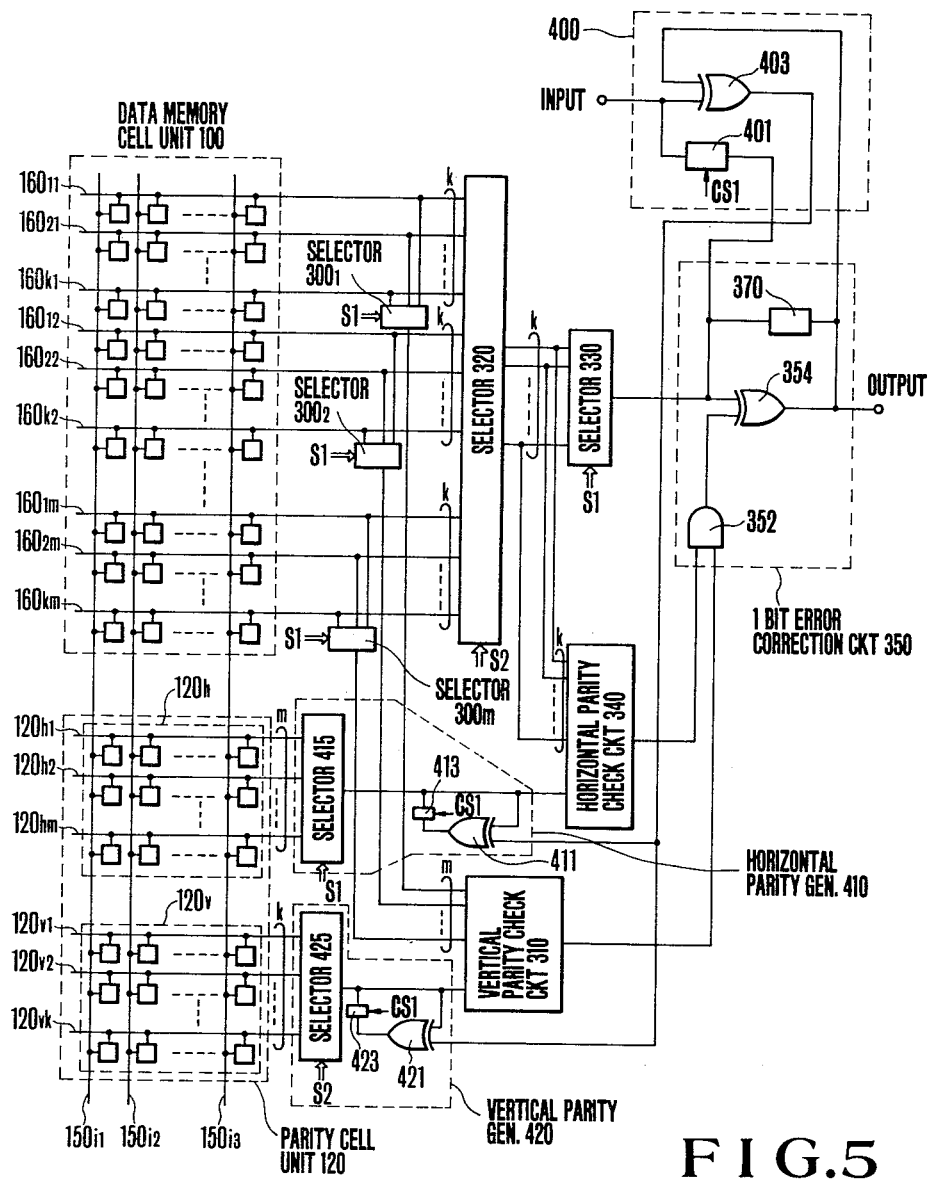
FIG. 5 is a block diagram of a semiconductor memory device according to another embodiment of the present invention.

FIG. 5 shows a semiconductor memory device according to another embodiment of the present invention, particularly a semiconductor memory device of plural words×1 bit type. Identical or corresponding parts in FIG. 5 are denoted by identical or corresponding reference characters in FIG. 2. A data memory cell matrix or unit 100 and a parity cell unit 120 composed of first and second extra memory matrices $120_h$, $120_v$ are of the same construction of those illustrated in FIG. 2. Therefore, the data memory cell unit 100 comprises a (k×m)-bit matrix arranged one-dimensionally in a pattern as shown in FIG. 1B, with memory cells being connected to common word lines. There are m groups of bit lines $160_{11}$–$160_{k1}$, $160_{12}$–$160_{k2}$, ... $160_{1m}$–$160_{km}$, and each group consisting of k bits.

Selectors $300_1$–$300_m$ are provided respectively for the m groups of data memory cells in the data memory cell unit 100. Now, suppose that several upper bits or several lower bits within bits of the external address signal are used as an address signal $S_1$ and the remaining bits as an address signal $S_2$. Each selector is connected to the bit lines in a corresponding group of data memory cells, and serves to select one-bit data bit information from k-bit data bit information in response to the signal $S_1$. Where information in a memory cell, for example, information stored in the memory cell connected to the bit line $160_{11}$ and the word line $150_{i1}$ is read out, the address signal $S_1$ is supplied to the selectors $300_1$, $300_2$ ... $300_m$ to select the uppermost bit line $160_{11}$, $160_{12}$, $160_{13}$ ... $160_{1m}$ of each of the in bit groups, each of which is constituted by k bit lines. As an example, the bit line $160_{11}$ is connected to the output of the selector $300_1$, the bit line $160_{12}$ is connected to the output of the selector $300_2$, and the bit line $160_{1m}$ is connected to the output of the selector $300_m$. Selected information of the memory cells connected to these bit lines and the word line $150_{i1}$ is outputted to the vertical parity check circuit 310. Selected output signals from the selectors are supplied as data bit information for vertical parity checking to a vertical parity checking circuit 310. The vertical parity checking circuit 310 is composed of a plurality of EXCLUSIVE-OR gates as with the above embodiment of FIG. 2, and is receptive of, besides the outputs from the selectors, a corresponding output from a vertical parity cell matrix $120_v$ via a vertical parity check bit generator 420 described in detail later on. The vertical parity checking circuit 310 produces an output as a result of vertical parity checking.

A selector 320 serves to select grouped k-bit data bit inforamtion from the (k×m)-bit data bit information supplied from the data memory cell unit 100 in response to an address signal $S_2$. That is, the address signal $S_2$ is supplied to the selector 320 to select k bit lines $160_{11}$, $160_{21}$, ... $160_{k1}$, each of which constitutes the uppermost bit line group. Selected information of the memory cells connected to these bit lines and the word line $150_{i1}$ is outputted to the horizontal parity check circuit 340 from the selector 320. Data bit information from a selected group of bit lines is delivered as an output from the selector 320 to a selector 330 and to a horizontal parity checking circuit 340 as data bit information for horizontal parity checking. The horizontal parity checking circuit 340 is composed of a plurality of EXCLUSIVE-OR gates as with the corresponding circuit of the foregoing embodiment. The horizontal parity checking cirucit 340 also receives an output from a horizontal parity cell matrix 120h via a horizontl parity check bit generator 410, and produces an output as a result of horizontal parity checking. The selector 330 is in response to an address signal $S_1$ for selecting data bit information fed from the groups of bit lines.

Outputs from the parity checking circuits 310, 340 and an output from the selector 330 are supplied to a one-bit error correction circuit 350. The error correction circuit 340 comprises an AND gate 352 receptive of the output from the horizontal parity checking circuit 340 and the output from the vertical parity checking circuit 310, and an EXCLUSIVE-OR gate 354 receptive of an output from the AND gate 352 and an output from the selector 330. The error correction circuit 350 serves to reverse the output from the selector 330 when both of the outputs from the parity checking circuits 340, 310 are "1", and issues such a reversed output. The output from the error correction circuit 350 is delivered out of the memory device.

The output from the error correction circuit 350, that is, error-corrected data bit information is fed back to the input of the error correction circuit 350 via a feedback path 370. The error-corrected data bit information thus fed back is stored again into desired memory cells or storage positions in the data memory cell unit 100 through the selectors 330, 320.

When it is necessary to write new input data in relation to the above re-storing operation, such new input data is supplied via a switch 401 in a data input circuit 400 to the output of the selector 330 and then stored via the selectors 330, 320 into desired memory cells in the data memory cell unit 100. Simultaneously with the writing of the new data in the data memory cell unit 100, the following parity data generating operation is performed.

The input circuit 400 includes an EXCLUSIVE-OR gate 403 in addition to the switch 401. The EXCLUSIVE-OR gate 403 is receptive of new input data and the output from the one-bit error correction circuit 350 to determine whether the new write data from the exterior source is different from the previous data. If different, then the EXCLUSIVE-OR gate 403 delivers an output, and horizontal and vertical parity check bit information related to the new data is supplied to horizontal and vertical parity check bit generators 410, 420.

The horizontal parity check bit generator 410 comprises an EXCLUSIVE-OR gate 411, a gate or switch 413, and a selector 415. The EXCLUSIVE-OR gate 411 is supplied with an output from the gate 403 in the data input circuit 400 and an output from the selector 415. when the gate 413 receives the control signal $CS_1$, an output of the gate 411 is stored via the selector 415 into a corresponding memory cell in the first extra memory matrix $120_h$ as horizontal parity check bit information. The gate 411 issues an output of "1" only when the inputs thereto are different from each other.

The vertical parity check bit generator 420 comprises an EXCLUSIVE-OR gate 421, a gate or switch 423, and a selector 425. the EXCLUSIVE-OR gate 421 is supplied with an output from the gate 403 in the data input circuit 400 and an output from the selector 415. When the control signal $CS_1$ is fed to the gate 423, an output of the gate 41 is stored as vertical parity check bit information ito a corresponding memory cell in the second extra memory cell matrix $120_v$ via the selector 425. The gate 421 produces an output of "1" only when the inputs thereto are different from each other.

With the arrangement according to the embodiment shown in FIG. 5, both fixed and unfixed bit errors can be saved or corrected. Particularly, the semiconductor memory device illustrated in FIG. 5 includes selectors for selecting data bit information necessary for generating horizontal and vertical parity check bit information and for horizontal and vertical parity checking, such that the wiring area and peripheral circuits needed can be smaller than that in the semiconductor memory device of FIG. 2. For example, the number of the gates constituting the parity checking/correctng unit becomes about one thirty-second (32th) of that of the embodiment shown in FIG. 2 that is about 140 gates. As described above, the semiconductor memory devices according to the present invention are advantageous in that they can save or correct both fixed and unfixed bit errors.

Although certain preferred embodiments have been shown and described in detail, it should be understood that various changes and modifications may be made therein without departing from the scope of the appended claims.

What is claimed is:

1. A semiconductor memory device comprising:
   at least one word line;
   a plurality of bit lines extending across said word line;
   a data memory cell unit including a plurality of data memory cells connected between said word line and said bit lines for storing information;

a plurality of first extra bit lines corresponding to first groups of the bit lines, each of which group has k bit lines (k is an integer), and extending across said word line;

a plurality of first extra memory cells connected between said word line and said first extra bit lines for storing first checking information with respect to the first groups of the bit lines;

a plurality of second extra bit lines corresponding to second groups of the bit lines, each of which group has m bit lines (m is an integer), and extending across said word line;

a plurality of second extra memory cells connected between said word line and said second extra bit lines for storing second checking information with respect to the second groups of the bit lines;

an error detection circuit for comparing the information fed from the data memory cells with the contents of said first and second extra memory cells to detect errors;

a circuit responsive to an output from said error detection circuit for correcting the information fed from said data memory cells; and said first extra bit lines being grouped correspondingly to said first gorups of the bit lines, said second extra bit lines being gruped correspondingly to said second groups of the bit lines, each of the second groups of the second extra bit lines being composed of one of the first extra bit lines in each first grup thereof.

2. A semiconductor memory device according to claim 1, wherein said first extra memory cells being capable of storing horizontal parity check bit information for said data memory cell unit, and said second extra memory cell being capable of storing vertical parity check bit information for said data memory cell unit.

3. A semiconductor memory device according to claim 1, further including horizontal and vertical parity check bit generators connected to said bit lines which are grouped differently for storing horizontal and vertical parity check bit information respectively into said first and second extra memory cells.

4. A semiconductor memory device according to claim 1, including a data input circuit for selectively supplying data from an exterior source and an output from said correcting cirucit to each of said bit lines.

5. A semiconductor memory device according to claim 1, wherein said error detection circuit comprises a horizontal parity checking circuit for comparing information from said data memory cells with horizontal parity check bit information from said first memory cells, and a vertical parity checking circuit for comparing information from said data memory cells with vertical parity check bit information from said second extra memory cells, the arrangement being that said correcting circuit corrects information from said data memory cells when outputs from said horizontal and vertical parity checking circuits agree with eac other.

6. A semiconductor memory device according to claim 5, wherein said correcting circuit comprises a plurality of first selectors for selecting data bit lines which constitute said second groups respectively from said first groups of the data bit lines and for connecting the selected data bit lines to said vertical parity checking ciruit, a second selector for selecting one group out of said first groups of the data bit lines, and third and fourth selectors for selecting first and second extra bit lines corresponding to said selected data bit lines from said plurality of first and second extra bit lines for said first and second extra memory cells and for connencting the selected first and second extra bit lines respectively to said horizontl and vertical parity checking circuits.

7. A semiconductor memory device according to claim 6, wherein said correcting circuit includes a fifth selector for successively selecting outputs from said second selector and for connecting the selected outputs to the error correcting circuit.

* * * * *